United States Patent
Sirito-Olivier et al.

(10) Patent No.: US 6,816,559 B1
(45) Date of Patent: Nov. 9, 2004

(54) FSK MODULATION TRANSCEIVER

(75) Inventors: Philippe Sirito-Olivier, Saint Egreve (FR); Christophe Dugas, Voreppe (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/531,794

(22) Filed: Mar. 21, 2000

(30) Foreign Application Priority Data

Mar. 30, 1999 (FR) .......................................... 99 04200

(51) Int. Cl.[7] .......................... H04L 27/14; H04L 27/10; H04B 15/00
(52) U.S. Cl. .......................... 375/344; 375/146; 375/272
(58) Field of Search .......................... 375/146, 272–303

(56) References Cited

U.S. PATENT DOCUMENTS

| | | | | |
|---|---|---|---|---|
| 2,640,106 A | | 5/1953 | Wilson et al. ................. | 178/69 |
| 3,944,742 A | * | 3/1976 | Cunningham ................ | 725/144 |
| 4,466,106 A | * | 8/1984 | Serrano ........................ | 375/223 |
| 4,481,642 A | * | 11/1984 | Hanson ........................ | 375/223 |
| 5,633,898 A | * | 5/1997 | Kishigami et al. ............ | 375/344 |
| 5,912,926 A | * | 6/1999 | Koenck et al. ............... | 375/295 |
| 5,945,885 A | * | 8/1999 | Schwartz et al. ............. | 332/100 |
| 6,275,542 B1 | * | 8/2001 | Katayama et al. ........... | 375/322 |
| 6,411,646 B1 | * | 6/2002 | Walley et al. ................ | 375/146 |

FOREIGN PATENT DOCUMENTS

DE    24 55 698    8/1976    .......... H04L/27/12

OTHER PUBLICATIONS

French Search Report from French Patent Application 99 04200, filed Mar. 30, 1999.
Patent Abstracts of Japan, vol. 017, No. 039 (E–1311), Jan. 25, 1993 & JP 04 258062 A (NEC Corp.).
Kise T. L. et al., "Half–Duplex FSK Modem" IBM Technical Disclosure Bulletin, US, IBM Corp. New York, vol. 21, No. 11, Apr. 1979, pp. 4461–4462.

* cited by examiner

*Primary Examiner*—Stephen Chin
*Assistant Examiner*—Lawrence Williams
(74) *Attorney, Agent, or Firm*—Lisa K. Jorgenson; James H. Morris; Wolf, Greenfield & Sacks, P.C.

(57) ABSTRACT

An FSK transceiver circuit, including a controlled oscillator used, in a transmission mode, to modulate a carrier by frequency shifts according to a binary transmission signal present on an input pin of the circuit, the shift amplitude being determined by an adjusting element connected to an adjusting pin of the circuit; two mixers connected to receive a reception signal present on a receive pin and, respectively, two carriers in phase quadrature of the controlled oscillator that, in receive mode, receives no modulating signal; and a demodulator connected to the outputs of the mixers via respective filters, the output of one of the filters being accessible from the outside by a circuit test pin.

47 Claims, 1 Drawing Sheet

FSK MODULATION TRANSCEIVER

BACKGROUND OF THE INVENTION

1. Field of the Invention

The present invention relates to a frequency shift keying (FSK) transceiver. Such circuits are generally used to transmit, especially by radio, digital data.

2. Discussion of the Related Art

The drawing schematically shows an FSK transceiver of a type usable according to the present invention. The transmit portion Tx and the receive portion Rx are integrated in the same circuit.

The transmit portion includes a phase-locked loop 10 used to obtain an adjustable carrier frequency. This phase-locked loop includes a reference oscillator 12, the output signal of which, of fixed frequency, is provided to a phase comparator 14. Phase comparator 14 receives the output of a controlled oscillator 16 via a divider 18. Oscillator 16 is controlled by a low-pass filter 20 that receives the output of phase comparator 14.

The binary signal to be transmitted $Tx_{in}$ is received on a pin 22 of the integrated circuit. Signal $Tx_{in}$ is added to the control signal of oscillator 16 at 24 via an amplifier 26. The gain of amplifier 26 determines the "deviation" of the FSK modulation, that is, the frequency shift undergone by the carrier provided by oscillator 16 when signal $Tx_{in}$ switches between logic levels 0 and 1. This deviation must in some applications be precisely determined. For this purpose, the gain of amplifier 26 is adjustable, for example, externally by means of an adjustable resistor 28 connected to a pin 30 of the circuit.

The output of oscillator 16 provides the modulated signal to be transmitted $Tx_{out}$ on a pin 32, possibly via an amplifier 34.

In receive portion Rx, a received modulated signal $Rx_{in}$, provided for example by an antenna 36, is applied on a pin 38 of the integrated circuit. An amplifier 40 transmits this signal to two mixers 42 and 43. The two mixers also respectively receive two carriers of same frequency in phase quadrature.

Since the circuit is generally used in a single way, either to transmit, or to receive, the controlled oscillator 16 of phase-locked loop 10 is used in receive mode to provide the two carriers in phase quadrature. Then, no modulating signal is provided to the phase locked-loop, so that oscillator 16 operates at the frequency defined by reference oscillator 12 and divider 18, which frequency is no other than the carrier frequency.

The outputs of mixers 42 and 43 are provided to respective low-pass filters 45 and 46. Two signals in phase quadrature, the frequency of which is that of the above-mentioned deviation, are thus obtained. Further, state 1 corresponds to a 90° phase advance of the first channel with respect to the other, and state 0 corresponds to a 90° phase lag of the first channel with respect to the other.

The output signals of filters 45 and 46, of sinusoidal shape, are provided to respective clipping amplifiers 48 and 49 intended for converting these signals into rectangular signals. These rectangular signals are provided to an FSK demodulator 51 that extracts logic values 0 or 1 by analyzing the phase of the signals provided by clipping amplifiers 48 and 49. Demodulator 51 provides the binary extracted signal Rxout to a pin of the integrated circuit.

Generally, since the number of circuit pins is high and the circuit is used in a single way, signal Rxout may be provided, as shown, to pin 22 which is used, in transmit mode, to receive signal $Rx_{in}$ to be transmitted. A switch K enables choosing the required function of pin 22.

As previously mentioned, the gain of amplifier 26 must be precisely adjusted to obtain a correct deviation in the modulation of the transmitted signal. For this purpose, the circuit is set to the transmit mode, a test signal is applied on pin 22, and the output signal sampled from pin 32 is analyzed. The analysis generally consists of performing a frequency demodulation followed by a spectrum analysis. Resistor 28 is adjusted until the spectrum corresponds to the desired deviation. This adjustment solution requires particularly expensive laboratory equipment.

SUMMARY OF THE INVENTION

An object of the present invention is to provide a solution enabling adjustment of the deviation with low cost laboratory equipment.

To achieve this and other objects, the present invention provides an FSK transceiver circuit, including a controlled oscillator used, in a transmission mode, to modulate a carrier by frequency shifts according to a binary transmission signal present on an input pin of the circuit, the shift amplitude being determined by an adjusting element connected to an adjusting pin of the circuit; two mixers connected to receive a reception signal present on a receive pin and, respectively, two carriers in phase quadrature of the controlled oscillator that, in receive mode, receives no modulating signal; and a demodulator connected to the outputs of the mixers via respective filters, the output of one of the filters being accessible from the outside by a circuit test pin.

According to an embodiment of the present invention, the controlled oscillator is part of a phase-locked loop.

The present invention also aims at a method for adjusting a circuit as described hereabove, including the steps of:

setting the controlled oscillator to the transmit mode;

applying a carrier on the receive pin;

applying a binary test signal on the input pin;

measuring the frequency of the signal present on the test pin; and acting upon the adjusting element to obtain the required frequency of the signal present on the test pin.

BRIEF DESCRIPTION OF THE DRAWINGS

The foregoing objects, features and advantages of the present invention will be discussed in detail in the following non-limiting description of specific embodiments in connection with the accompanying drawing, which schematically shows an FSK modulation transceiver circuit enabling implementation of the present invention.

DETAILED DESCRIPTION

Figure 1:
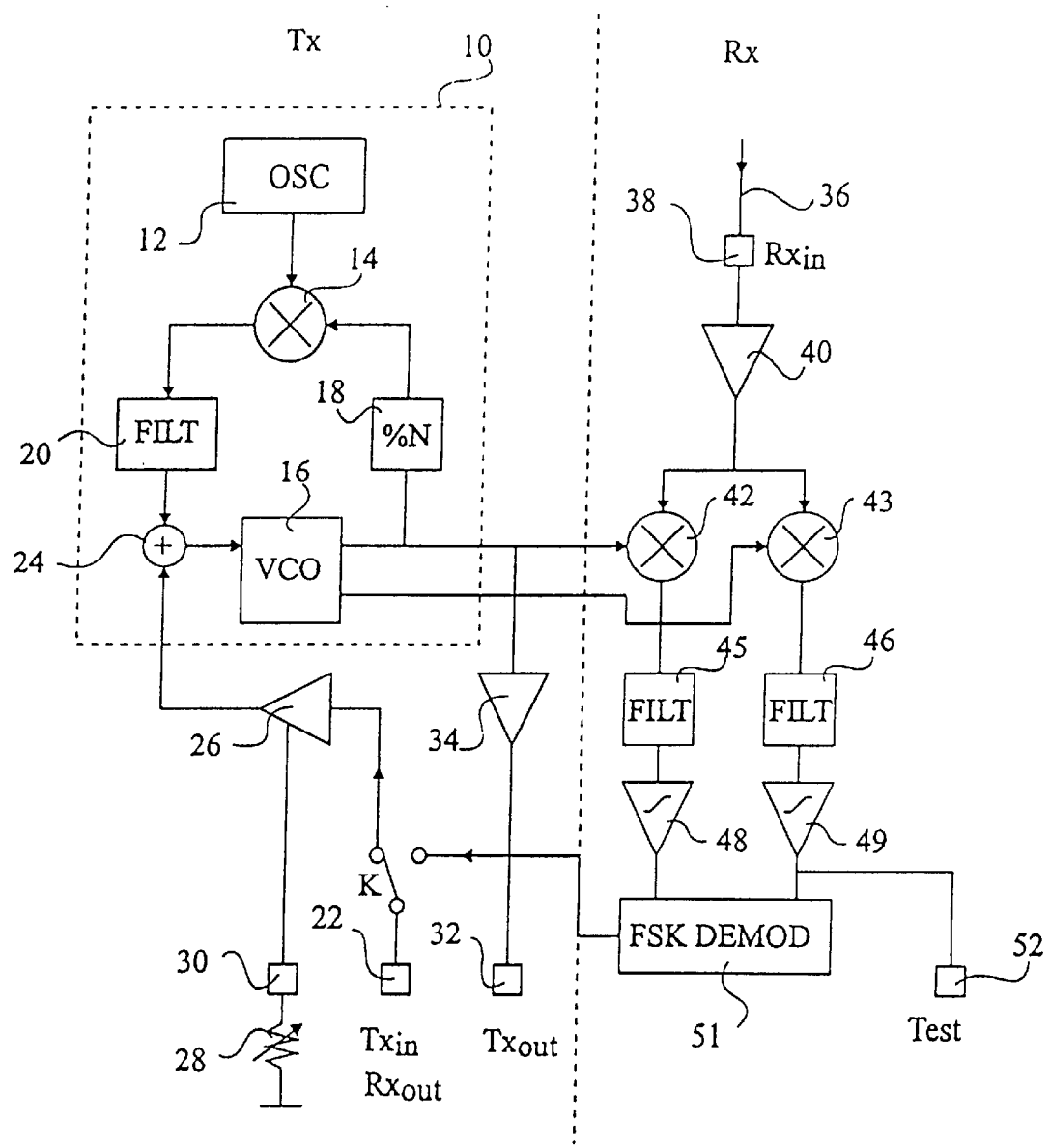

The present invention exploits the specific architecture of the transceiver of the drawing to adjust the deviation, that is, the frequency shift of the carrier modulated according to the logic values of the signal to be transmitted, using low cost measurement equipment.

For this purpose, the circuit is set to the transmit mode and a binary test signal is applied on input pin 22. This is conventional. However, the resulting modulated signal on output pin 32 is not analyzed. Instead of this, the portion Rx of the circuit used for reception which, normally is not used when the circuit is in transmit mode, is used. A non-modulated carrier, corresponding to the non-modulated carrier provided by oscillator 16 of phase-locked loop 10 when the circuit is in receive mode, is applied on input terminal 38 of the receive portion.

As a result, mixers 42 and 43 receive signals interchanged with respect to a receive operation: instead of receiving a fixed carrier from oscillator 16, they receive a carrier modulated by the test signal applied on pin 22 and, instead of receiving a carrier modulated by pin 38, they receive a fixed carrier. However, mixers 42 and 43 will behave in the same way and provide, via respective filters 45 and 46 and respective clipping amplifiers 48 and 49, rectangular signals having the frequency of the frequency shift imposed on oscillator 16 by the test signal applied on pin 22. It is then sufficient to measure the frequency of one of these rectangular signals and to adjust resistance 28 until the required frequency is obtained.

By so operating, only a frequency generator that provides the carrier to pin 38 and a frequency meter (or an oscilloscope) for measuring the frequency of the output signal of one of clipping amplifiers 48 or 49 are required.

Of course, access must be possible from the outside (i.e., external to the circuit) to the output of one of clipping amplifiers 48 and 49, which is not connected to the outside in a conventional circuit. For this purpose, as shown as an example, the output of amplifier 49 is connected to a dedicated test pin 52.

As previously indicated, the number of pins is often limited, and it is possible that no more pins are available to create test pin 52. In this case, the output of amplifier 49 may be connected, by means of a switch, to a pin that is not used in transmit mode, as is done for pin 22.

Further, a one-way transceiver circuit such as described herein is often provided to reduce or minimize the current consumption. In this case, in transmit mode, the receive portion of the circuit is set to stand-by, while in receive mode, the transmit portion of the circuit, except phase-locked loop 10, is set to stand-by. Conversely, the present invention needs to use both portions. In this case, an additional operating mode of the circuit is provided, that is, a test mode in which both portions of the circuit are active, while in the two other modes, the circuit portions will be conventionally deactivated. A greater freedom of choice for the pins likely to be used as a test pin 52 is then available in test mode.

Of course, the present invention is likely to have various alterations, modifications, and improvements which will readily occur to those skilled in the art. In the described example, the output of a clipping amplifier is sampled to perform the frequency measurement. Indeed, it is simpler to measure the frequency of a rectangular logic signal than that of sinusoidal signals such as provided by filters 45 and 46. However, measuring the frequency of these sinusoidal signals is not excluded.

Further, a system where the modulation and carrier generation are performed by means of a phase-locked loop has been described. However, the present invention also applies to a system using an open-loop controlled oscillator to perform the carrier modulation and generation.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An FSK transceiver circuit, including:
    a controlled oscillator used, in a transmission mode, to modulate a carrier by frequency shifts according to a binary transmission signal present on an input pin of the circuit, the shift amplitude being determined by an adjusting element connected to an adjusting pin of the circuit,
    two mixers connected to receive a reception signal present on a receive pin and, respectively, two carriers in phase quadrature of the controlled oscillator that, in receive mode, receives no modulating signal, and
    a demodulator connected to the outputs of the mixers via respective filters, the output of at least one of the filters providing a signal accessible from the outside by a circuit test pin.

2. The transceiver circuit of claim 1, wherein the controlled oscillator is part of a phase-locked loop.

3. A method for adjusting the circuit of claim 1, including the step of:
    setting the controlled oscillator to the transmit mode;
    applying a carrier on the receive pin;
    applying a binary test signal on the input pin;
    measuring the frequency of the signal present on the test pin; and
    acting upon the adjusting element to obtain the required frequency of the signal present on the test pin.

4. An integrated circuit comprising:
    an FSK transceiver circuit including:
    a controlled oscillator used, in a transmit operating mode, to modulate a carrier by frequency shifts according to a binary signal, the frequency shifts having an amplitude determined by an adjusting element connected to a pin of the integrated circuit, the controlled oscillator being further used, in a receive operating mode, to generate two non-modulated carriers that are in phase quadrature;
    two mixers each having an input connected to a pin of the integrated circuit, and each further receiving a respective one of the two non-modulated carriers that are in phase quadrature; and
    a demodulator connected to an output of one of the mixers via a first filter and connected to an output of the other mixer via a second filter; and
    at least one of the filters providing a signal accessible from the outside by a test pin.

5. The integrated circuit of claim 4 wherein the binary signal is present on a first pin of the integrated circuits the pin connected to the input of the two mixers is a second pin of the integrated circuit, and the pin to access an output of one of the filters is a third pin of the integrated circuit.

6. The integrated circuit of claim 5 wherein the first pin is a Txin/Rxout pin and the second pin is a receive pin.

7. The integrated circuit of claim 6 wherein the input of the two mixers is connected to the receive pin through an amplifier.

8. The integrated circuit of claim 4 wherein the test pin is connected directly to the output of the filter.

9. The integrated circuit of claim 4 wherein the demodulator is connected to the output of the filter through an amplifier.

10. The integrated circuit of claim 9 wherein the amplifier is configured as a clipping amplifier.

11. The integrated circuit of claim 4 wherein the test pin is a dedicated test pin.

12. The integrated circuit of claim 4 wherein the test pin is connected to the output of the filter through a switch.

13. The integrated circuit of claim 12 wherein the test pin is not needed in one of the operating modes.

14. The integrated circuit of claim 4, wherein the controlled oscillator is part of a phase-locked loop.

15. The integrated circuit of claim 4, wherein the FSK transceiver circuit further includes a test operating mode.

16. The integrated circuit of claim 14, wherein the phase-locked loop is part of a transmit portion of the FSK transceiver circuit, the mixers are part of a receive portion of the FSK transceiver circuit, and wherein the receive portion is inactive in the transmit mode, the transmit portion except for the phase-locked loop is inactive in receive mode, and both the transmit portion and receive portion are active in a test mode.

17. An apparatus comprising:
an integrated circuit having an FSK transceiver circuit that includes:
a controlled oscillator used, in a transmit operating mode, to modulate a carrier by frequency shifts according to a binary signal, the frequency shifts having an amplitude determined by an adjusting element connected to a pin of the integrated circuit, the controlled oscillator being further used, in a receive operating mode, to generate two non-modulated carriers that are in phase quadrature;
two mixers each having an input connected to a pin of the integrated circuit, and each further receiving a respective one of the two non-modulated carriers that are in phase quadrature; and
a demodulator connected to an output of one of the mixers via a first filter and connected to an output of the other mixer via a second filter; and
means for providing a signal having a frequency equal to the amplitude of the frequency shifts.

18. The apparatus of claim 17 wherein the means for providing a signal having a frequency equal to the amplitude of the frequency shifts includes means for filtering the output of one of the mixers.

19. The apparatus of claim 17 wherein the means for providing a signal having a frequency equal to the amplitude of the frequency shifts includes a test pin to access an output of one of the filters from outside the integrated circuit.

20. The apparatus of claim 19 wherein the binary signal is present on a first pin of the integrated circuit, the pin connected to the input of the two mixers is a second pin of the integrated circuit, and the test pin is a third pin of the integrated circuit.

21. The apparatus of claim 19 wherein the first pin is a Txin/Rxout pin and the second pin is a receive pin.

22. The apparatus of claim 21 wherein the input of the two mixers is connected to the receive pin through an amplifier.

23. The apparatus of claim 19 wherein the test pin is connected directly to the output of the filter.

24. The apparatus of claim 16 wherein the demodulator is connected to the output of the filter through an amplifier.

25. The apparatus of claim 24 wherein the amplifier is configured as a clipping amplifier.

26. The apparatus of claim 19 wherein the test pin is a dedicated test pin.

27. The apparatus of claim 19 wherein the test pin is connected to the output of the filter through a switch.

28. The apparatus of claim 27 wherein the test pin is not needed in one of the operating modes.

29. A method comprising:
providing an FSK transceiver circuit that includes a controlled oscillator used, in a transmit operating mode, to modulate a carrier by frequency shifts according to a binary signal on a first pin, the frequency shifts having an amplitude determined by an adjusting element connected to a pin, the controlled oscillator being further used, in a receive operating mode, to generate two non-modulated carriers that are in phase quadrature, the FSK transceiver circuit further including two mixers each having an input connected to a second pin of the integrated circuit, and each further receiving a respective one of the two non-modulated carriers that are in phase quadrature; the FSK transceiver circuit further including a demodulator connected to an output of one of the mixers via a first filter and connected to an output of the other mixer via a second filter;
setting the controlled oscillator to an operating mode in which the controlled oscillator modulates a carrier by frequency shifts according to the binary signal on the first pin;
applying a binary test signal on the first pin;
applying a carrier on the second pin; and
filtering the output of one of the mixers to generate a signal having a frequency equal to the amplitude of the frequency shifts.

30. The method of claim 29 further comprising measuring the frequency of the signal having a frequency equal to the amplitude of the frequency shifts on a third pin.

31. The method of claim 30 further comprising acting upon the adjusting element to obtain a required frequency of the signal present on the third pin.

32. The method of claim 29 further comprising providing a third pin to access an output of one of the filters from outside the integrated circuit.

33. The method of claim 32 further comprising measuring the frequency of the signal present on the third pin.

34. The method of claim 33 further comprising acting upon the adjusting element to obtain a required frequency of the signal present on the third pin.

35. The method of claim 29 wherein the input of the two mixers is connected to the second pin through an amplifier.

36. The method of claim 32 wherein the pin to access an output of one of the filters is connected directly to the output of the filter.

37. The method of claim 29 wherein the demodulator is connected to the output of the filter through an amplifier.

38. The method of claim 37 wherein the amplifier is configured as a clipping amplifier.

39. The method of claim 38 wherein the pin to access an output of one of the filters is a dedicated test pin.

40. The method of claim 32 wherein the pin to access an output of one of the filters is connected to the output of the filter through a switch.

41. A method of operating an integrated circuit FSK transceiver in a test mode, comprising:
a) providing a non-modulated carrier signal having a non-modulated frequency to a receive pin of the integrated circuit FSK transceiver;
b) providing a binary test signal to an input pin of the integrated circuit FSK transceiver;
c) modulating the non-modulated carrier signal with the binary test signal to produce a modulated signal having a modulated frequency;
d) combining the modulated signal and the non-modulated carrier signal to produce a combined signal having a combined frequency; and e) using an adjustable element of the integrated circuit FSK transceiver to adjust the combined frequency.

42. The method of claim 41, wherein the act of providing a non-modulated carrier signal is performed using an oscillator of the integrated circuit FSK transceiver.

43. The method of claim 41, wherein the combined frequency is approximately equal to a frequency difference between the non-modulated frequency and the modulated frequency.

44. The method of claim 41, further comprising an act of using a test pin to monitor the combined signal.

45. The method of claim 41, wherein act d) comprises using a mixer of the integrated circuit FSK transceiver to receive the non-modulated carrier signal and the modulated signal as inputs and to output a mixer output.

46. The method of claim 45, wherein the mixer output has a frequency approximately equal to the combined frequency.

47. The method of claim 45, wherein act d) further comprises using a filter of the integrated circuit FSK transceiver to receive the mixer output as an input and to output the combined signal.

* * * * *

UNITED STATES PATENT AND TRADEMARK OFFICE
CERTIFICATE OF CORRECTION

PATENT NO.    : 6,816,559 B1
DATED         : November 9, 2004
INVENTOR(S)   : Philippe Sirito-oliver and Christophe Dugas It is certified that error appears in the above-identified patent and that said Letters Patent is hereby corrected as shown below:

<u>Column 4,</u>
Line 50, should read:
-- signal is present on a first pin of the integrated circuit, the --

Signed and Sealed this

Fourth Day of January, 2005

JON W. DUDAS
*Director of the United States Patent and Trademark Office*